July 15, 1947.  C. M. ZENER ET AL  2,423,867
METHOD AND APPARATUS FOR STRESS-STRAIN TESTING
Filed June 3, 1944  3 Sheets-Sheet 1
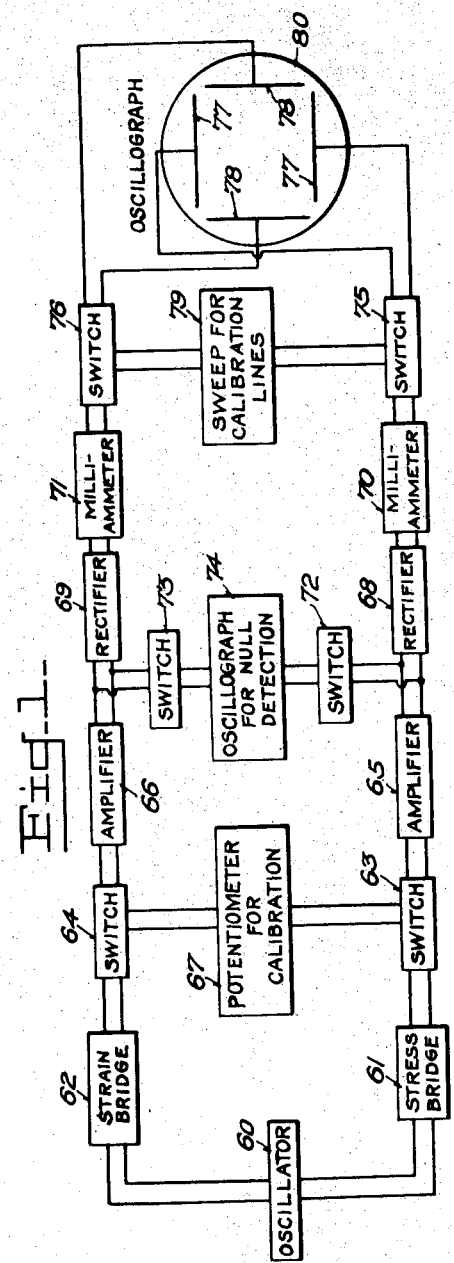
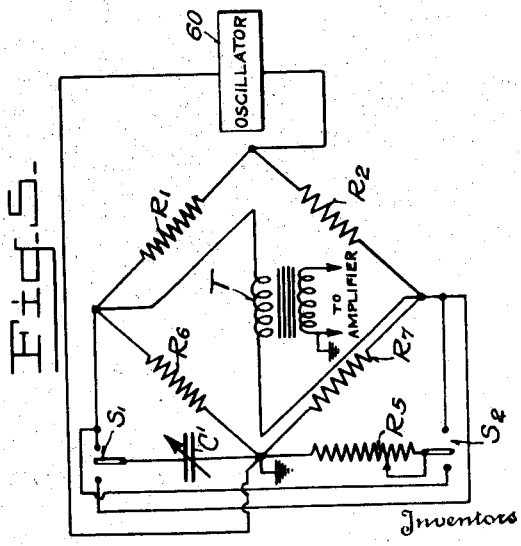
Inventors
CLARENCE M. ZENER,
DELBERT M. VAN WINKLE,
By C. E. Herrstrom + H. E. Thibodeau
Attorneys July 15, 1947.  C. M. ZENER ET AL  2,423,867
METHOD AND APPARATUS FOR STRESS-STRAIN TESTING
Filed June 3, 1944   3 Sheets-Sheet 2
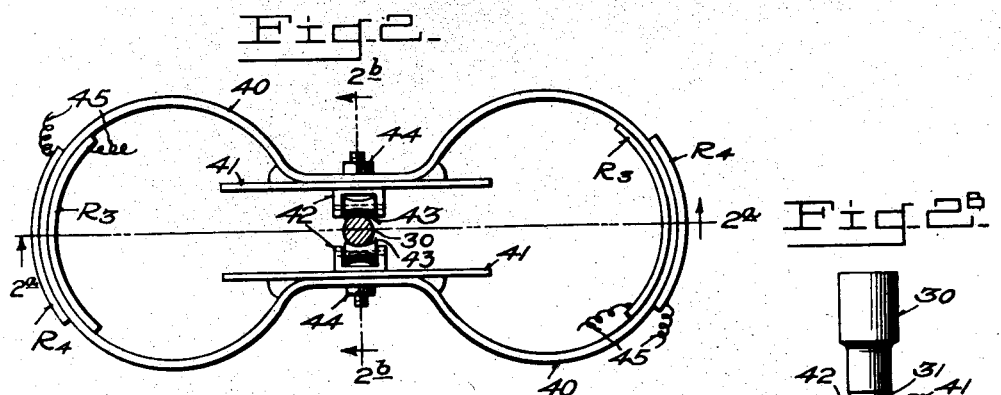
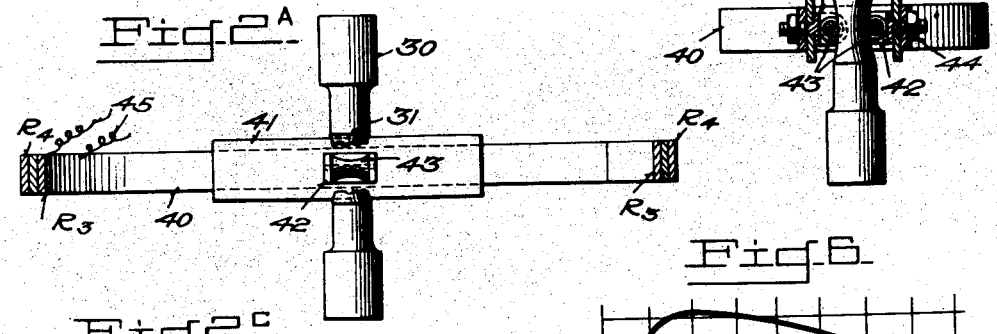
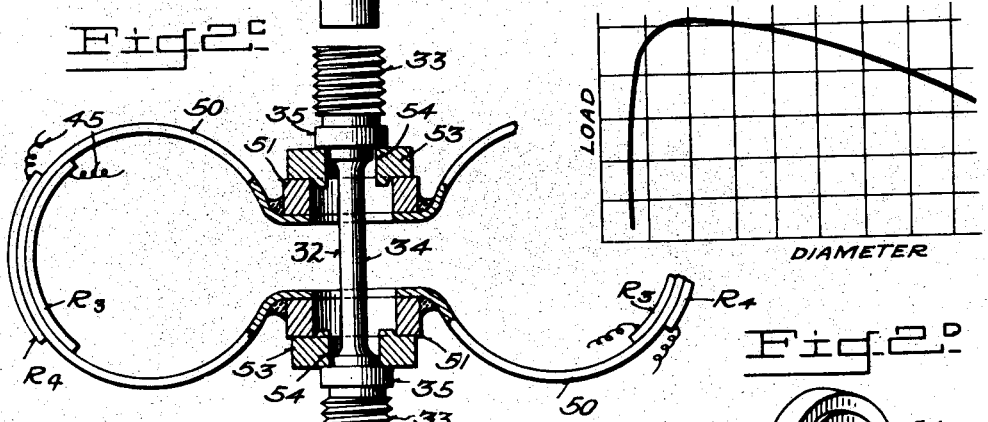
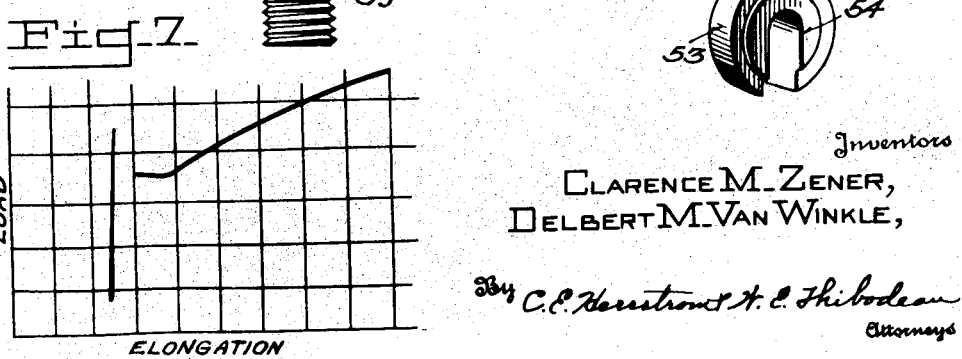
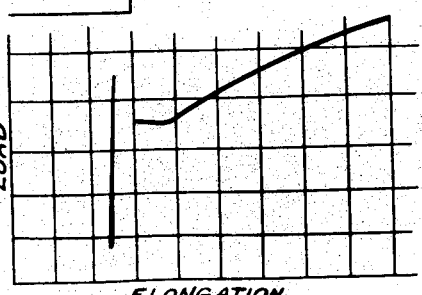
Inventors
CLARENCE M. ZENER,
DELBERT M. VAN WINKLE, Patented July 15, 1947

2,423,867

UNITED STATES PATENT OFFICE 2,423,867

METHOD AND APPARATUS FOR STRESS-STRAIN TESTING

Clarence M. Zener, Newton Center, and Delbert M. Van Winkle, Newtonville, Mass.

Application June 3, 1944, Serial No. 538,674

6 Claims. (Cl. 201—63)

(Granted under the act of March 3, 1883, as amended April 30, 1928; 370 O. G. 757)

The invention described herein may be manufactured and used by or for the Government for governmental purposes without the payment to us of any royalty thereon.

In many mechanical constructions, and particularly in ordnance, metallic components are subjected in service to deformations, both in the elastic and plastic range, at rates of strain far in excess of those permitting obtaining of stress-strain readings in conventional manner on a standard tensile testing machine. To obtain the stress-strain properties of metals under such severe conditions by subjecting them to stresses in a high speed testing machine presents unusual problems of measuring and recording the rapidly varying stress and strain in the test specimen.

Accordingly, it is the object of this invention to provide an improved testing and recording method and apparatus that will automatically record precisely equivalent values of stress and strain in a specimen subjected to the application of stress at a rapid rate.

A particular object of this invention is to provide improved gages that will accurately indicate the deformation in a test specimen either as a function of reduction in diameter of the test specimen or elongation of the test specimen.

A further object of this invention is to provide a gage attachment for a standard testing machine which will provide an electrical indication of the stress applied by such a machine to a test specimen irrespective of the rate of application of such stress.

The specific nature of the invention as well as other objects and advantages thereof will clearly appear from a description of a preferred embodiment as shown in the accompanying drawings in which:

Fig. 1 is a schematic diagram of the indicating and recording circuit utilized.

Fig. 2 is a top elevational view of one form of resistance strain gage operating on reduction in diameter of the test specimen.

Fig. 2A is a sectional view taken along plane 2a—2a of Fig. 2.

Fig. 2B is a sectional view taken along the plane 2b—2b of Fig. 2.

Fig. 2C is a side elevational view partly in longitudinal section of another form of resistance strain gage wherein such gage is so constructed as to produce an indication proportional to the elongation of a test specimen.

Fig. 2D is an enlarged perspective view of a part utilized with the strain gage illustrated in Fig. 2C.

Fig. 3 is a side elevational view of an attachment utilized to provide an indication of the stress exerted by a standard testing machine on a test specimen.

Fig. 3A is a top elevational view of Fig. 3.

Fig. 4 is a perspective view showing the strain gage in Fig. 3 attached to a standard testing machine.

Fig. 5 is a schematic view of a conventional Wheatstone circuit which is incorporated in the circuit of Fig. 1.

Fig. 6 illustrates the film record obtained with the strain gage shown in Fig. 2.

Fig. 7 illustrates the film record obtained when utilizing the strain gage shown in Fig. 2C.

Fig. 8 is a diagram of the calibrating sweep circuit utilized.

In accordance with this invention the physical quantities to be measured, i. e., the stress applied to the test specimen and the resulting change in diameter or length of the specimen, are correlated to deformations respectively produced in each of two metallic electrical resistance elements, the strain-resistance properties of which are known. Resistance type electric strain gages are attached to the test specimen in such a manner that the strain produced in the test specimen is quantitatively transmitted to the electric strain gage. Likewise by means of an attachment to the standard testing machine, a strain, proportional to the stress applied to the test specimen by the testing machine is applied to an electric strain gage. The resistance elements of these strain gages are each incorporated in a separate alternating current Wheatstone bridge circuit so that the resistance change of the gages is translated into an amplified potential appearing across the output terminals of the bridge circuit. The amplified output potential of each bridge is then amplified, rectified, passed through a suitable meter and applied to the plates of a cathode ray oscillograph. The electron beam of the oscillograph is focused to produce a point source of light on the cathode ray screen. With the voltage derived from the stress measuring gage applied to the vertically deflecting plates and the voltages derived from the strain measuring gage applied to the horizontally deflecting plates of the cathode ray oscillograph, the electron beam will describe a curve correlated to stress-strain conditions in the test specimen as the test proceeds. This path may of course be photographed to provide a permanent record. The meter is utilized as an indicator during calibration of the apparatus and may also be read during low speed tests to provide an additional record of the test.

The improved stress and strain gages utilized in this testing apparatus serve as "desensitizers," i. e., they transform a strain displacement of about .25" for example into approximately a .003 strain in the electric strain gage. Such desensitizing is necessary in order that an electric resistance type strain gage may be employed and thereby permit the measurement of stress or strain by an electrical process.

In Fig. 4 there is disclosed an attachment for a standard testing machine whereby the load exerted by such machine on a test specimen is converted into a proportional change in resistance of an electric resistance strain gage. The attachment comprises an L-shaped supporting block 1, a horizontal arm 2 which is secured to a portion 20 of the frame of a standard tensile testing machine (not shown) by means of a clamping bar 4 mounted on a screw 5 and clamped against frame portion 20 by means of a nut 6. The vertical arm 3 of support 1 lies adjacent to the end of the balance arm 21 of the testing machine. On top of vertical arm 3 a cantilever beam element 7 is mounted by means of a plate 8 and screws 9. On the end of cantilever beam element 7 there is provided a contact member which preferably comprises a screw 10 threaded through beam element 7 and a lock nut 11. The end of screw 10 engages the top surface of balance arm 21 when arm 21 is in its position of balance.

The proper proportions of the cantilever beam 7 will obviously vary with the maximum force which the balance arm of the tensile machine is capable of exerting. However, the determination of the size of the beam can be made from standard formulas by computing the dimension of a beam that will yield a small displacement, on the order of a quarter of an inch, under the upward force exerted by the balance arm at the maximum load to be used and which in addition will yield such an end displacement with a surface strain preferably less than .003, as a .003 strain is currently considered a reasonable upper limit for resistance strain gages. On both the top and bottom surfaces of cantilever beam element 7 conventional electric resistance strain gage elements R1 and R2 are fastened, preferably by cementing. As stress is applied to the test specimen by the testing machine, the balance arm 21 will tend to rise in conventional manner and hence will produce a deflection of cantilever beam element 7. The surface strain produced in beam element 7 produces in conventional manner, a change in value of electric resistance of strain gages R1 and R2.

One embodiment of the gage utilized for measuring the strain in a specimen 30 is shown in Fig. 2. This gage comprises a tempered spring steel frame 40 which is formed into approximately a figure 8. A pair of reinforcing plates 41 are secured, preferably by welding, in opposed relationship to the frame 40 at its narrow central region. Both of the plates 41 are drilled and tapped to receive yokes 42 and a roller 43 is mounted in each yoke 42. Lock nuts 44 are threaded on the end portion of yokes 42 extending through reinforcing plates 41. Electric resistance strain members R3 and R4 are cemented to the loops of the frame 40 and suitable leads 45 are provided to connect the resistance strain members R3 and R4 to the indicating circuit which will be described. The frame 40 is so proportioned that when mounted around a test specimen 30 of conventional shape, the rollers 43 will yieldingly engage a reduced diameter portion 31 of a test specimen 30. As the test specimen 30 is subjected to stress in the standard tensile testing machine, its diameter will be reduced and it will begin to neck down at the reduced cross section 31. Hence the rollers 43 tend to move together due to the spring force of the frame 40. Accordingly, the resistance of the electric resistance strain gages R3 and R4 is proportionally changed.

The rollers 43 perform an important function in that they automatically locate themselves throughout a test at the smallest diameter portion of the test specimen 30. It is of course impossible to predict prior to the test at just what point along reduced diameter portion 31 of the test specimen 30 the greatest necking down will occur but a gage constructed in accordance with this invention automatically locates itself at the narrowest portion and thereby provides a more accurate indication of the maximum strain produced in the test specimen.

In Fig. 2C there is shown another form of gage for indicating the strain in a test specimen, this gage being constructed to produce an indication proportional to the elongation of a test specimen. This gage comprises a spring tempered frame 50 shaped in a form approximating a figure 8. A pair of collars 51 are secured to the frame 50, preferably by welding, in opposed relationship at the narrow central portion of the frame 50. Electric resistance strain gages R3 and R4 are respectively cemented to each of the loops of the frame 50. Suitable leads 45 are provided to connect resistance gages R3 and R4 to the indicating circuit which will be described.

The test specimen 32 utilized in conjunction with this gage is of somewhat different configuration. Test specimen 32 has customary threaded ends 33 for mounting in a standard tensile testing machine and an intermediate reduced diameter portion 34. The juncture between the central portion 34 and end portions 33 forms shoulders 35. The gage is assembled by inserting specimen 32 through the collars 51. The collars 51 are then pressed together, thus stressing frame 50, and keys 53 are respectively inserted between collars 51 and shoulders 35 of the test specimen. The keys 53 have a raised portion 54 which fits in the bore of the collars 51. The test specimen 32 is then mounted in a standard testing machine and a tensile stress applied to the specimen. As the specimen elongates under such stress the collars 51 separate, following the elongation. The strain in frame 50 is thereby reduced proportionally with the elongation of specimen 32. Hence the resistance of the resistance gages R3 and R4 changes in proportion to the strain in the test specimen. It is of course obvious that the frame 50 must be under sufficient strain in the original assembled position so that such strain will not be wholly relieved at the point at which the rupture of specimen 32 occurs.

It should be noted that both types of strain gages herein described remain on the test specimen throughout the test and are unharmed by fracture of the specimen. The useful life of such gages is thus practically unlimited.

In Fig. 1 there is shown a schematic diagram of the indicating and recording circuit utilized in conjunction with the apparatus heretofore described. The resistance elements R1 and R2 of the stress measuring gage shown in Fig. 4 are incorporated in two arms of a conventional Wheatstone bridge circuit indicated as the stress bridge 61. It should be noted that by utilizing two active stress gages in the two variable arms of the bridge circuit, the effect of temperature is substantially cancelled out between the two arms and hence only changes in resistance due to strain are measured. The resistance elements R3 and R4 of either the strain gage shown in Figs. 2 or 2c are incorporated as two arms of a conventional Wheatstone bridge circuit indicated as the strain bridge 62. An alternating input potential is supplied to both bridges by a common oscillator 60.

The bridge circuits utilized for both the stress bridge 61 and strain bridge 62 are substantially identical and are shown in detail in Fig. 5. The resistance elements of electric resistance strain gages R1 and R2 are connected as two variable arms of the bridge 61 while fixed resistances R6 and R7 form the fixed arms of the bridge. The resistance elements R1, R2, R6 and R7 are preferably substantially equal under zero load conditions, thereby increasing the sensitivity of the bridge circuit. Since as indicated in Fig. 1 the oscillator 60 supplies both the stress bridge 61 and the strain bridge 62, one side of the oscillator is grounded to prevent coupling between the two bridge circuits. The output of the bridge circuit is connected through an impedance matching transformer T1, which as will be seen, permits the grounding of the subsequent amplifier stage.

To vary the resistance of the fixed arms of the bridge, a variable resistance R5 and a variable condenser C1 are connected to switches S1 and S2 in the manner indicated in Fig. 5 whereby either resistance R5 or condenser C1 can be connected in parallel with fixed resistances R6 and R7. The bridge may thus be readily balanced. Strain bridge 62 constitutes a similar arrangement only utilizing resistance elements R3 and R4 of the strain gages as the variable arms.

Referring again to the schematic diagram in Fig. 1, the output of stress bridge 61 and strain bridge 62 are respectively connected through switches 63 and 64 to the input of variable gain linear amplifiers 65 and 66. A voltage divider 67, such as a potentiometer, is interconnected with switches 63 and 64 in such a manner that manipulation of switch 63 will connect potentiometer 67 between stress bridge 61 and amplifier 65 and manipulation of switch 64 will connect the potentiometer 67 between strain bridge 62 and amplifier 66. Potentiometer 67 is utilized for calibration purposes as will be described.

The outputs of amplifiers 65 and 66 are connected respectively to rectifiers 68 and 69 and milliammeters 70 and 71. Switches 72 and 73 are respectively connected across the outputs of amplifiers 65 and 66 and may be operated to connect an oscillograph 74 across the output of either amplifiers.

Connected to the outputs of milliammeters 70 and 71 are double pole, double throw switches 75 and 76. In one position, switch 75 connects its channel to the vertically deflecting plates 77 of the cathode ray oscillograph 80; in the other position, switch 75 connects plates 77 to a calibration sweep circuit unit 79. Switch 76 performs a similar function for the strain bridge channel, in one position connecting its channel to horizontally deflecting plates 78 of the cathode ray oscillograph and in the other position connecting plates 78 to the calibration sweep circuit unit 79.

Calibration sweep circuit unit is shown in detail in Fig. 8 and comprises an arrangement for charging or discharging a condenser C2 through a resistance R8. A battery B is arranged to be connected by a switch S3 to charge the condenser C2 through resistance R8. A resistance R9 is connected across the battery and switch whereupon opening of switch S3 permits the condenser C2 to discharge through the resistances R8 and R9 in series. The voltage across condenser C2 is applied to either plates 77 or plates 78 of the cathode ray oscillograph 80 by means of the switching units 75 and 76. It should be noted that a trace of very uniform intensity is obtained by closing and opening switch S3, as this causes a traverse and retraverse of the cathode ray beam. The sum of the velocities of traverse and retraverse of the beam at any one point is substantially constant.

The oscillograph 74 is utilized for a balancing indicator for either the stress bridge 61 or the strain bridge 62. The switch 72 may be thrown to connect the oscillograph 74 across the output of amplifier 65 and stress bridge 61 may then be balanced to produce zero indication on oscillograph 74 by means of variable resistance R5 and variable condenser C1 of the bridge circuit. In similar manner by operation of switch 73 the oscillograph 74 may be utilized to balance the strain bridge 62. A sensitive meter could of course be substituted for oscillograph 74.

With the apparatus described, calibration lines on the screen of the cathode ray oscillograph 80 may be readily produced. It is, of course, understood that the light traces produced on the cathode ray screen are photographed by any suitable camera (not shown), hence the calibration lines are first produced on a particular film and then the stress-strain curves of a particular specimen are photographed on the same film. To produce horizontal calibration lines corresponding to units of applied stress, the stress bridge 61 is first balanced with zero load on the stress gage illustrated in Fig. 3. Switch 63 is then operated to connect potentiometer 67 between stress bridge 61 and amplifier 65. A load greater than the maximum expected load in the test to be run is then applied to the stress gage. Such load produces an unbalance of stress bridge 61 and hence a voltage output proportional to the load. The potentiometer 67 is preferably divided into tenth units and hence successive voltages of .1, .2, .3, etc., of the maximum load voltage may be applied to the input of variable gain amplifier 65. The gain of amplifier 65 is adjusted so that the maximum voltage applied produces a deflection on milliammeter 70 corresponding to a full vertical deflection of the beam of the cathode ray oscillograph 80. Switch 76 is operated to connect the plates 78 of the cathode ray oscillograph to the calibration sweep circuit unit 79. Then for each voltage step obtained from potentiometer 67 the switch S3 of calibration sweep circuit unit 79 is manipulated, which causes the cathode ray beam to traverse a horizontal path between plates 78. The vertical position of the horizontal path of the beam is, of course, determined by the voltage on plates 77, which voltage is in turn determined by the setting of potentiometer 67. Thus a series of horizontal lines corresponding to one tenth units of maximum stress are traced across the cathode ray screen and when photographed by the camera (not shown) appear as in Figs. 6 and 7.

The vertical calibration lines are obtained in an exactly similar manner by applying a known strain to the resistance elements R3 and R4 of the strain gages shown in Figs. 2 and 2C. Switch 64 of course is operated to connect potentiometer 67 between strain bridge 62 and amplifier 66. Switch 76 is positioned to connect the strain bridge channel to plates 78 of the cathode ray oscillograph 80 while switch 75 is operated to connect the sweep circuit calibration unit 79 to plates 77. In this manner a series of vertical lines are traced on the cathode ray screen equivalent to one tenth units of strain. The appearance of such calibration lines on the film is shown in Figs. 6 and 7.

It will be appreciated that such a method of calibration eliminates any non-linearity which might exist in the rectifier, the amplifier or the cathode ray deflection. Since the first step in obtaining each stress-strain record consists in placing the calibrated coordinate system upon the film, it will be apparent that a high degree of accuracy is consistently obtained.

To make the actual recording of the stress-strain curve of a specimen subjected to stress in a standard tensile testing machine, the stress gage shown in Fig. 3 is applied to the tensile machine in a manner heretofore described. The stress bridge 61 is then balanced to a zero loading. A load slightly over the maximum expected load is then produced in the testing machine. This of course produces a deflection of the stress gage and in turn a proportional unbalancing of the stress bridge 61. The gain of amplifier 65 is then adjusted so that the milliammeter 70 reads a value corresponding to that necessary to produce full vertical deflection of the cathode ray beam.

The strain gage illustrated in Fig. 2 is then placed on a cylindrical rod whose diameter is equal to or slightly larger than the initial diameter of the test specimen. The strain bridge 62 is then balanced under these conditions. The strain gage is then placed on a cylindrical rod whose diameter is slightly smaller than the smallest diameter anticipated to be produced in the test specimen and the gain of the amplifier 66 is adjusted until the milliammeter 71 reads a value equivalent to that which will produce full horizontal deflection of the cathode ray beam. A similar calibrating method is applied when utilizing a gage of the type shown in Fig. 2C.

The apparatus is then in condition for testing of a specimen. The strain gage is placed on the test specimen 30 or 32 and the test specimen inserted in the standard tensile testing machine. The machine is set into operation and stress may be applied at any desired rate depending only upon the characteristics of the particular testing machine. As the test proceeds, amplified voltages proportional to the stress applied to the test specimen are produced upon the vertically deflecting plates 77 of oscillograph 80 and amplified voltages proportional to strain in the test specimen are produced on the horizontally deflecting plates 78. The cathode ray beam thus traces a load deformation curve on the cathode ray screen and this tracing is recorded upon the film in the camera (not shown) which film already has the calibrated coordinate system upon it. Since the apparatus records instantaneous diameters of the test specimen, a time stress-strain curve may be computed, even throughout "necking" of the specimen. It is therefore apparent that accurate recording of all portions of the stress-strain curve is obtainable independent of the rate of application of stress of the machine. Figures 6 and 7 illustrate the film records obtained respectively with strain gages as in Figs. 2 and 2C.

This apparatus is particularly useful even in tests where the stress is applied at a slow rate in that it will accurately record those critical portions of the stress-strain curve, for example, around the yield point where sudden changes in the elongation and stress values are encountered. With the standard apparatus it is practically impossible to obtain an accurate measurement of the stress in this region by the customary manually operated balancing arrangement.

We claim:

1. A strain gage comprising a resilient band shaped substantially as a figure 8, a pair of rollers mounted in opposed relationship on the interior surfaces of said band at its narrow central portion, said rollers being constructed and arranged to resiliently engage the diameter of a test specimen under the bias of said band, and electrical means secured to said band for indicating change in deformation of said band.

2. A strain gage comprising a resilient band shaped substantially as a figure 8, a pair of rollers mounted in opposed relationship on the interior surfaces of said band at its narrow central portion, said rollers being rotatably mounted on parallel axes and having concave peripheral surfaces whereby the diameter of a test specimen may be resiliently engaged by said rollers and an electrical resistance element secured to each loop of said band, said elements constructed and arranged to vary in resistance proportionally to changes in deformation of said band.

3. A strain gage comprising a resilient band shaped substantially as a figure 8, said band having a pair of aligned holes in each side thereof at its narrow central portion, said holes arranged to receive a test specimen insertable therethru, a pair of collars, each mounted in overlapping relation to one of said holes, said collars arranged to be resiliently biased against spaced shoulders on the test specimen by the spring force of said band, and an electrical resistance element secured to each loop of said band, said elements constructed and arranged to vary in resistance proportionally to changes in deformation of said band.

4. A measuring apparatus comprising a resilient band-like member, a pair of electrical resistance elements constructed and arranged to vary in resistance proportionally to deformation thereof, said electrical resistance elements being secured to said band-like member at locations on opposite sides of a test specimen, and means for flexing said band-like member in a manner to induce beam stresses therein responsive to the variable being measured.

5. In a measuring apparatus, the combination of a resilient band-like member adapted to surround a test specimen; and a pair of electrical resistance elements adapted to vary in resistance proportionally to deformation thereof, said elements being secured to said member at diametrically opposite ends of said member remote from said test specimen.

6. A measuring apparatus comprising a resilient band shaped substantially as a figure 8, means on said band for engaging a test specimen under the bias of said band, and electrical means secured to said band for indicating deformation of said band.

CLARENCE M. ZENER.
DELBERT M. VAN WINKLE.

REFERENCES CITED

The following references are of record in the file of this patent:

UNITED STATES PATENTS

| Number | Name | Date |
|---|---|---|
| 2,323,724 | Nadai | July 6, 1943 |
| 2,252,464 | Kearns | Aug. 12, 1941 |
| 2,356,763 | Keinath | Aug. 29, 1944 |
| 2,316,975 | Ruge | Apr. 20, 1943 |
| 2,359,245 | Ritzmann | Sept. 26, 1944 |